Jan. 9, 1951  C. E. WALTON  2,537,722
OVERRUNNING CLUTCH
Filed Sept. 14, 1944
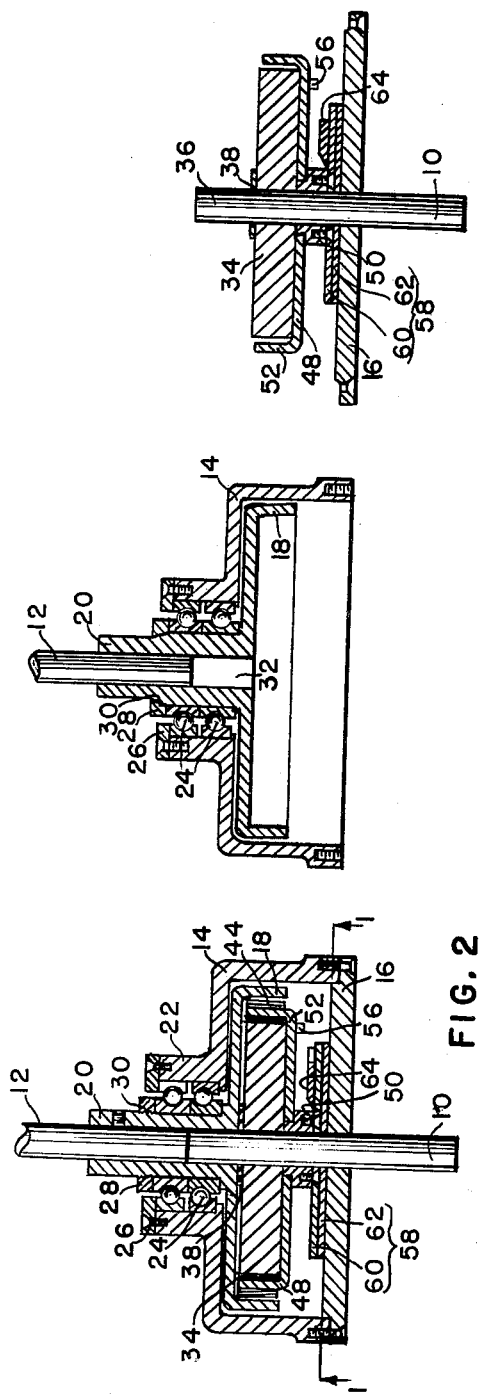
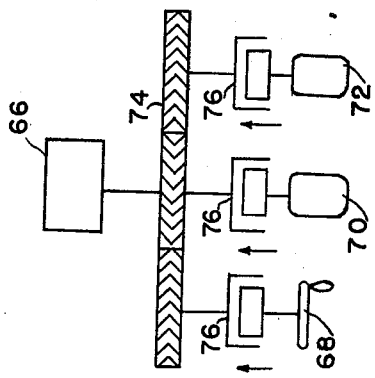
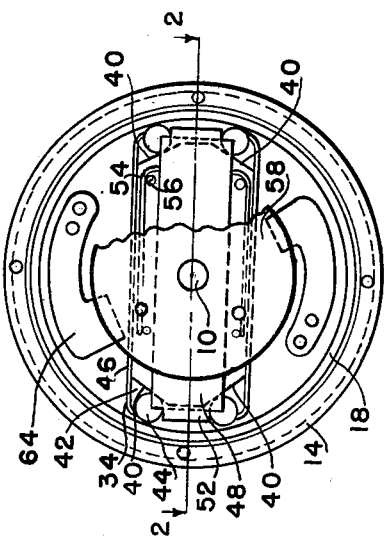
Inventor
CECIL E. WALTON
By W. Glenn Jones
Attorney Patented Jan. 9, 1951

2,537,722

UNITED STATES PATENT OFFICE 2,537,722

OVERRUNNING CLUTCH

Cecil E. Walton, New London, Conn., assignor to the United States of America as represented by the Secretary of the Navy Application September 14, 1944, Serial No. 554,088

4 Claims. (Cl. 192—44)

1

The general concept of overrunning clutches is not new. The present invention relates to an overrunning clutch meeting certain requirements not satisfied by known existing types, including the ability of a driving member to pick up a driven member irrespective of the rotational direction of the former.

The general object of the present invention has been to provide a clutch of the type indicated whereby the driven mechanism may be driven in either direction of rotation by any one of two or more driving means without transmitting the motion of the driven mechanism to the idle driving means. Other and more specific objects will become apparent as the present description proceeds.

Referring to the drawings:

Fig. 1 is a plan view of the clutch from the driving end, with the cover plate removed;

Fig. 2 is a sectional view as indicated by the lines 2—2 of Fig. 1;

Fig. 3 is a sectional view similar to Fig. 2 but showing the driving and driven sections separated; and, Fig. 4 is a schematic diagram showing the use of the clutch in its relationship to other elements of the mechanism in which it is incorporated.

Referring now to Figs. 1, 2 and 3, the clutch joins a driving shaft 10 to a driven shaft 12. The working parts of the clutch are enclosed by a fixed case 14 and cover plate 16. A drum 18 having an intergal hub 20 is carried in an extension sleeve 22 of the case 14 by anti-friction bearings 24 which are held by a retaining ring 26 on the sleeve and a nut 28 carried on a correspondingly threaded portion 30 of the hub 20. The driven shaft 12 extends only part way into the hub 20, leaving a space 32 which forms a bearing for the end of the driving shaft 10.

The present device establishes a lock between the driving and driven members by wedging rollers between the inner face of the drum 18 and the inclined faces or ramps formed on a member to be locked to the drum. To this end a member 34, hereafter called the ramp member, is secured to the driving shaft 10 in such a position that the protruding end of the shaft forms a journal 36 which runs in the bearing 32 of the drum 12. A washer 38 serves to separate the ramp member from the drum 18 when the clutch is assembled. The ends of the ramp member 34 are shaped to form four ramps 40 (Fig. 1). These ramps are so made that they, in conjunction with the inner cylindrical surface of the drum 18, form wedge-shaped spaces 42. Four rollers 44 are held in these spaces by springs 46.

To control the position of the rollers with respect to the ramps an actuating arm 48 is secured to a hub 50 which makes a running fit on the driving shaft 10 as does the cover plate 16.

2

The ends of the actuating arm 48 are bent over to form fingers 52 which fit between the two rollers 44 at either end of the ramp member 34. These fingers are of such width that when the actuating arm is parallel to the ramp member, the rollers are held sufficiently far down their respective ramps that, because of the shape of the tips of the springs 46, they are not in contact with the drum. As a result there is no connection between the ramp member and the drum and hence none between the driving and driven shafts to which they are respectively fixed.

The actuating arm 48 is centered with respect to the ramp member 34 by means of springs 54 secured at one end to the ramp member and bearing on the sides of the actuating arm at the other end. Relative motion between the arm and the member is limited by stop pins 56 protruding from the ramp member.

To overcome the combined pressure of the springs 46 and 54 and permit sufficient relative motion between the ramp member 34 and the actuating arm 48 a friction device 58 is provided, located between the hub 50 and the cover plate 16. This friction device consists of a pressure plate 60 secured to the hub 50 and a felt disk 62 between the pressure plate and the cover plate. Springs 64 fastened to the cover plate 16 at one end bear on the surface of the pressure plate 60 at the other with sufficient pressure to produce the desired friction.

When the driving shaft 10 is turned, the ramp member 34 turns in relation to the actuating arm 48 which is restrained by the action of the friction device 58. The actuating arm pushes the rollers 44 which are located at the trailing corners of the ramp member farther out of engagement with the drum 18 against the pressure of the corresponding springs 46. Simultaneously the rollers at the leading corners of the ramp member are forced into engagement with the drum by their related springs. These rollers jam between the ramp member and the drum, locking them together and imparting the rotation of the driving shaft 10 to the driven shaft.

When the driven shaft 12 is turned, the driving shaft 10 being stationary, the clutch mechanism is in its neutral position and all the rollers 44 are held away from the drum 18. This leaves the drum free to turn with the driven shaft.

The schematic diagram Fig. 4 illustrates an application of the clutch. A mechanism 66 is to be driven by any one of the power sources 68, 70 or 72. Shafts from these power sources are brought together by gearing represented by 74. In the absence of the clutches represented by 76, power applied at one source, for example 68, would have to turn not only the mechanism 66 but also the other two power sources 70 and 72. If, however, the clutches 76 are introduced between the power sources and the gearing 74 in such a manner that power can be transmitted only in the direction indicated by the arrows, power applied at any one source will be transmitted by its associated clutch through the gearing only to the mechanism 66, the other clutches "free-wheeling" and transmitting no power to their associated power sources.

Obviously, modifications of the form and proportions of the parts may be made to suit requirements without departing from the spirit and scope of this invention, as defined in the appended claims.

What is claimed is:

1. In a reversible automatically engaging clutch means, a driven shaft carrying a co-axial drum fixedly secured thereto, a driving shaft co-axial with said driven shaft carrying a ramp member fixedly secured thereon and adapted to fit withfixedly in said drum, a pair of adjacent ramps angularly disposed with respect to each other on said ramp member, a roller positioned between each of said ramps and said drum, an arm freely rotatable on said driving shaft having a finger extending over the end of said ramp member and between said rollers adapted to normally hold said rollers apart sufficiently to prevent clutching action between said ramps and said drum through said rollers, resilient means to hold said arm in normal central position with respect to said ramp member, resilient means to urge said rollers toward each other against said finger so as to normally maintain said clutch in disengaged position, and means responsive to the rotation of said driving shaft to move said ramp member relative to said arm to engage a desired roller with the surface of said drum.

2. In a reversible automatically engaging clutch means, a driven shaft carrying a drum fixedly secured thereto containing a co-axial guide bearing, a driving shaft carrying a ramp member fixedly secured thereto adapted to fit within said drum and a guide journal bearing extending into said guide bearing, a pair of ramps angularly disposed with respect to each other on said ramp member, a roller positioned between each of said ramps and said drum, an arm freely rotatable on said driving shaft having a finger extending over the end of the ramp member and between said rollers adapted to normally hold said rollers spaced apart sufficiently to prevent clutching action between the ramps and the drum through said rollers, resilient means to hold said arm in normal central position with respect to said ramp member and resilient means to urge said rollers toward each other against said finger so as to normally maintain said clutch in disengaged position, a housing for said clutch having a nonfriction bearing in which the drum is rotatively mounted, a cover for said housing through which the driving shaft is passed, having a friction surface around said driving shaft and a friction disk mounted on said arm resiliently urged against said friction surface for restricting the initial movement of said arm when the driving shaft is turned, thus to further disengage the trailing roller and engage the forward roller between the ramp and the drum so as to engage the clutch to drive the driving shaft.

3. In a reversible automatic engaging clutch means, a driven shaft carrying a drum fixedly secured thereto having a co-axial guide bearing therein, a driving shaft carrying a ramp member fixed thereon and adapted to fit within said drum and a journal extending into said guide bearing, two pairs of ramps diametrically spaced on said ramp member, said ramps in each of said pairs of ramps being angularly disposed with respect to each other, a roller positioned between each of said ramps and said drum, an arm freely rotatable on said driving shaft having fingers extending over respective ends of said ramp member and between adjacent pairs of said rollers adapted to normally hold the rollers of each of said pairs spaced apart sufficiently to prevent clutching action between the ramps and the drum through said rollers, resilient means to hold said arm in normal central position with respect to said ramp member, resilient means to urge the rollers in each of said pairs toward each other against said fingers so as to normally maintain said clutch in disengaged position, and friction means operated by the acceleration of said driving shaft to move said ramp member relative to said arm to engage a selected two of said rollers with said drum.

4. In a reversible automatically engaging clutch means, a driven shaft carrying a drum fixedly secured thereon and containing a co-axial guide bearing, a driving shaft carrying a ramp member fixed thereto and adapted to fit within said drum and a journal extending into said guide bearing, two pairs of ramps diametrically spaced on said ramp member, the ramps in each of said pairs of ramps being angularly disposed with respect to each other, two pairs of rollers, each of said rollers being positioned between one of said ramps and said drum, an arm freely rotatable on said driving shaft having a pair of fingers each extending over the edge of said ramp member and between said pairs of rollers adapted to normally hold the rollers of each of said pairs spaced apart sufficiently to prevent clutching action between the ramps and the drum through said rollers, resilient means to hold said arm in normal central position with respect to said ramp member and resilient means to urge the rollers in each of said pairs toward each other against said fingers so as to normally maintain said clutch in disengaged position, a housing for said clutch having a nonfriction bearing in which the drum is rotatively mounted, a cover for said housing through which the driving shaft is passed, having a friction surface around said driving shaft and a friction disk mounted on said arm resiliently urged against said friction surface for restricting the initial movement of said arm when the driving shaft is turned, thus to further disengage the trailing roller and engage the forward roller between the ramp and the drum so as to engage the clutch to drive the driving shaft.

CECIL E. WALTON.

REFERENCES CITED

The following references are of record in the file of this patent:

UNITED STATES PATENTS

| Number | Name | Date |
|---|---|---|
| 1,163,803 | Bickford | Dec. 14, 1915 |
| 1,456,008 | Nuanes | May 22, 1923 |
| 1,466,394 | Fornaca | Aug. 28, 1923 |
| 2,180,599 | Menasco | Nov. 21, 1939 |

FOREIGN PATENTS

| Number | Country | Date |
|---|---|---|
| 115,043 | Germany | Nov. 14, 1900 |
| 290,747 | Great Britain | May 12, 1928 |